United States Patent [19]
Brcic

[11] 3,934,217
[45] Jan. 20, 1976

[54] THERMOSTAT CONTROL DEVICE

[75] Inventor: Ivo Brcic, Willowdale, Canada

[73] Assignee: The Raymond Lee Organization, Inc., New York, N.Y. ; a part interest

[22] Filed: Aug. 9, 1974

[21] Appl. No.: 496,254

[52] U.S. Cl. ............................ 337/107; 337/102
[51] Int. Cl.² ........................................ H01H 61/02
[58] Field of Search ............ 219/492; 337/102, 107, 337/141, 377, 378; 286/103

[56]  References Cited
UNITED STATES PATENTS

| 3,588,774 | 6/1971 | Caveney | 337/377 X |
| 3,799,433 | 3/1974 | Bauer | 337/377 X |
| 3,849,753 | 6/1973 | Nichols | 337/141 X |

Primary Examiner—J. D. Miller
Assistant Examiner—Fred E. Bell
Attorney, Agent, or Firm—Daniel Jay Tick

[57] ABSTRACT

An electric heating device is positioned in close proximity with a thermostat. An electrical energizing device energizes the heating device. The energizing device includes a switch for selectively actuating and deactivating the energizing of the heating device. A timer is coupled to the switch. The timer closes the switch thereby energizing the heating device and raising the temperature in the area of the thermostat above room temperature by $\Delta T$ determined by the amount of heat generated by the heater and the distance between the heater and the thermostat. The timer opens the switch after a preselected period of time thereby deenergizing the heating device and lowering the temperature in the area of the thermostat to the room temperature whereby the thermostat controls the room temperature in accordance with the setting thereon.

2 Claims, 3 Drawing Figures

U.S. Patent   Jan. 20, 1976   3,934,217
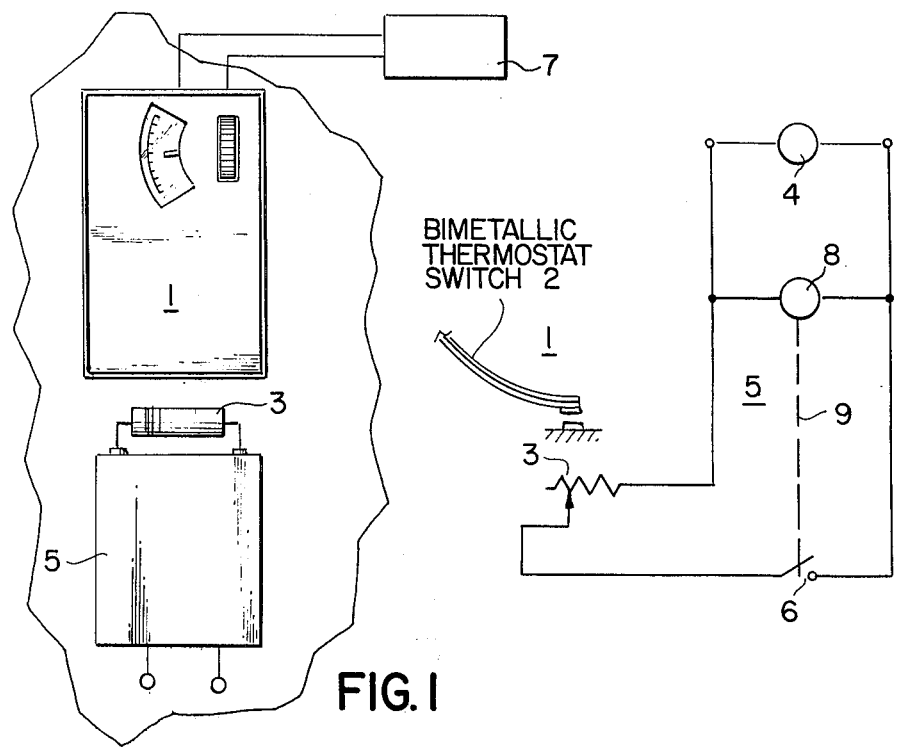
FIG.1   FIG.2
FIG.3
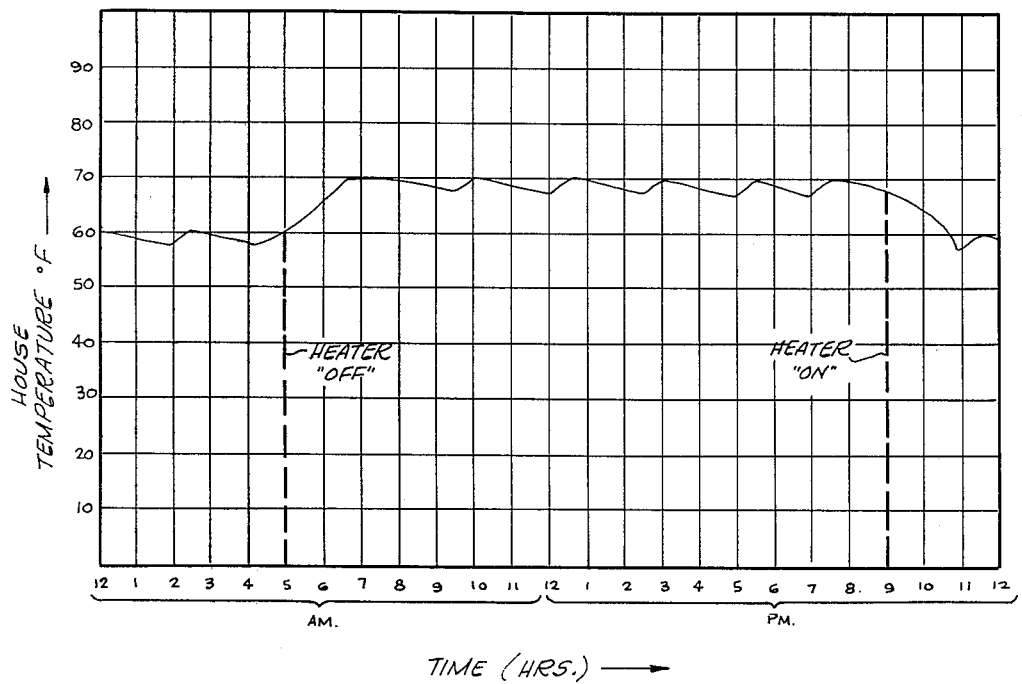

THERMOSTAT CONTROL DEVICE

DESCRIPTION OF THE INVENTION:

The present invention relates to a thermostat offsetting device. More particularly, the invention relates to a thermostat offsetting device for controlling the operation of a thermostat.

Objects of the invention are to provide a thermostat offsetting device of simple structure, which is inexpensive in manufacture, operable with convenience and facility, installable in new and existing structures with convenience and facility, and operates effectively, efficiently and reliably to offset and control the operation of a thermostat.

In order that the invention may be readily carried into effect, it will now be described with reference to the accompanying drawing, wherein:

FIG. 1 is a block diagram of an embodiment of the thermostatic offsetting device of the invention;

FIG. 2 is a circuit diagram of the embodiment of FIG. 1; and

FIG. 3 is a graphical presentation illustrating the operation of the thermostat offsetting device of the invention.

The thermostat offsetting device of the invention controls the operation of a thermostat 1 (FIG. 1). The thermostat 1 may include, for example, a bimetallic thermostat switch 2 (FIG. 2).

The thermostat offsetting device of the invention comprises an electric heating device 3 (FIGS. 1 and 2) in close proximity with the thermostat 1, preferably with the bimetallic thermostat switch 2 of said thermostat. The thermostat 1 has a selected setting $T_o$ thereon. The electric heating device 3 preferably comprises a resistance heating element of any suitable type.

An electrical energizing device energizes the heating device 3 from a source 4 of electrical energy such as, for example, a commercial source. The electrical energy may be provided in the standard 115 volts at a frequency of 60 Hertz. The energizing device 5 (FIGS. 1 and 2) includes a switch 6 (FIG. 2) for selectively activating the energizing of the heating device 3 and selectively deactivating the energizing of said heating device.

In accordance with the invention, a timer 8 of any suitable type (FIG. 2) is coupled to the switch 6, as indicated by the broken lines 9 in FIG. 2. The timer 8 closes the switch 6 thereby energizing the heating device 3 and raising the temperature in the area of the thermostat above room temperature by $\Delta T$. The temperature increment $\Delta T$ is determined by the amount of heat generated by the heating device 3 and the distance between the heating device and the thermostat 1. The timer 8 opens the switch 6 after a preselected period of time thereby deenergizing the heating device 3 by opening the circuit to the electrical energy source 4 and lowering the temperature in the area of the thermostat to the room temperature. The thermostat 1 temperature is then the same as the room temperature and the thermostat controls the room temperature in accordance with the setting $T_o$ thereon.

When the switch 6 is closed, the room temperature dips by $\Delta T$ from the temperature $T_o$ set on the thermostat 1. The thermostat 1 controls the temperature around the level $T_o - \Delta T$.

FIG. 3 illustrates the operation of the thermostat offsetting device of the invention. In FIG. 3, the abscissa represents the time in hours and the ordinate represents the house temperature in degrees Fahrenheit. In the example of FIG. 3, the switch 6 is closed from 9 P.M. to 5 A.M. The timer 8 opens the switch 6 at 5 A.M. and thereby deenergizes the heating device 3, so that the thermostat 1 operates normally from 5 A.M. until 9 P.M. At 9 P.M., the switch 6 is closed by the timer 8.

While the invention has been described by means of a specific example and in a specific embodiment, I do not wish to be limited thereto, for obvious modifications will occur to those skilled in the art without departing from the spirit and scope of the invention.

I claim:

1. A thermostat offsetting device for controlling the operation of a thermostat having a selected setting thereon, said thermostat offsetting device comprising
    an electric heating device in close proximity with a thermostat;
    electrical energizing means for energizing the heating device, said energizing means including switch means for selectively activating the energizing of the heating device and deactivating the energizing of the heating device; and
    timer means coupled to the switch means for closing the switch means thereby energizing the heating device and raising the temperature in the area of the thermostat above room temperature by $\Delta T$ determined by the amount of heat generated by the heating device and the distance between the heating device and the thermostat and opening the switch means after a preselected period of time thereby deenergizing the heating device and lowering the temperature in the area of the thermostat to the room temperature whereby the thermostat controls the room temperature in accordance with the setting thereon.

2. A thermostat offsetting device as claimed in claim 1, wherein the heating device comprises a resistance heating element.

* * * * *